(No Model.) 2 Sheets—Sheet 1.
J. J. JOHNSTON.
FLOWER VASE.
No. 265,098. Patented Sept. 26, 1882.
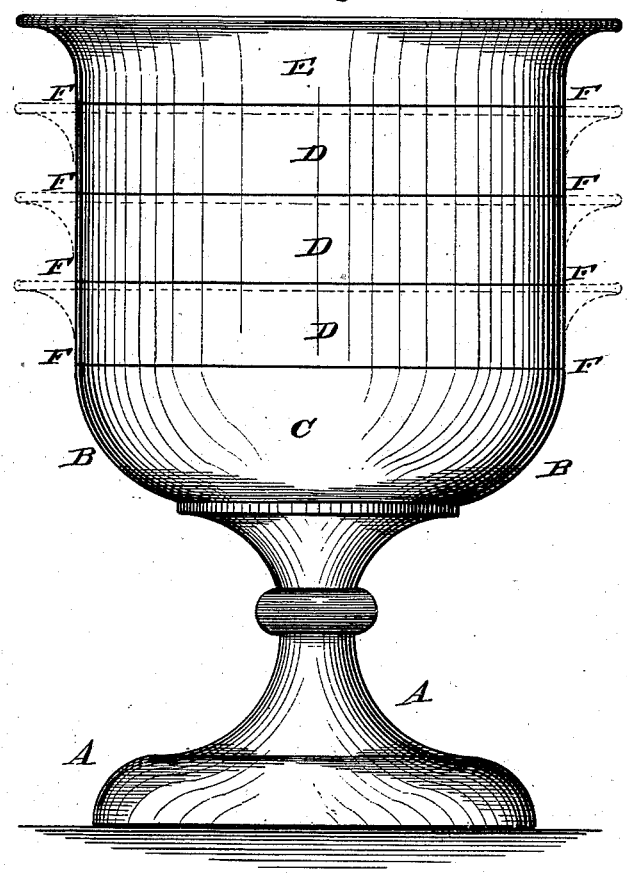
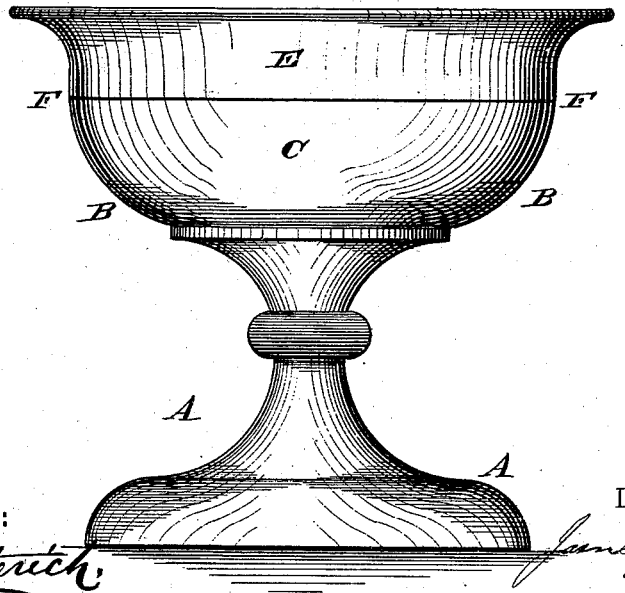
WITNESSES:
Fred. G. Dieterich
P. C. Dieterich
INVENTOR.
James J. Johnston (No Model.) 2 Sheets—Sheet 2.

J. J. JOHNSTON.
FLOWER VASE.

No. 265,098. Patented Sept. 26, 1882.

WITNESSES:
Fred. G. Dieterich.
P. C. Dietrich.

INVENTOR.
James J. Johnston

United States Patent Office.

JAMES J. JOHNSTON, OF COLUMBIANA, OHIO, ASSIGNOR TO THE UNITED STATES IMPROVEMENT COMPANY, (LIMITED,) OF SAME PLACE.

FLOWER-VASE.

SPECIFICATION forming part of Letters Patent No. 265,098, dated September 26, 1882.

Application filed February 23, 1882. (No model.)

*To all whom it may concern:*

Be it known that I, JAMES J. JOHNSTON, of Columbiana, in the county of Columbiana and State of Ohio, have invented a certain new and useful Improvement in Flower-Vases; and I do hereby declare that the following is a full, clear, and exact description thereof, reference being had to the accompanying drawings, and to the letters of reference marked thereon.

My invention relates to an improvement in flower-vases; and it consists in making the body of the earth-chamber in a series of detachable sections, whereby said chamber can be increased or diminished in depth at the pleasure of the user, as will hereinafter more fully and at large appear.

To enable others skilled in the art with which my invention is most nearly connected to make and use it, I will proceed to describe its construction and operation.

Figure 3:
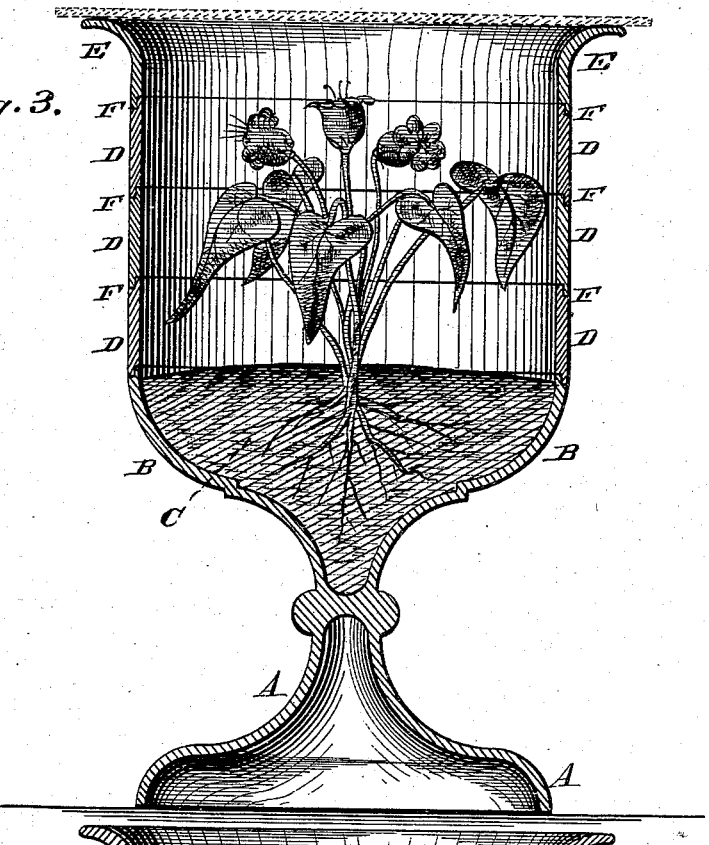
Figure 4:
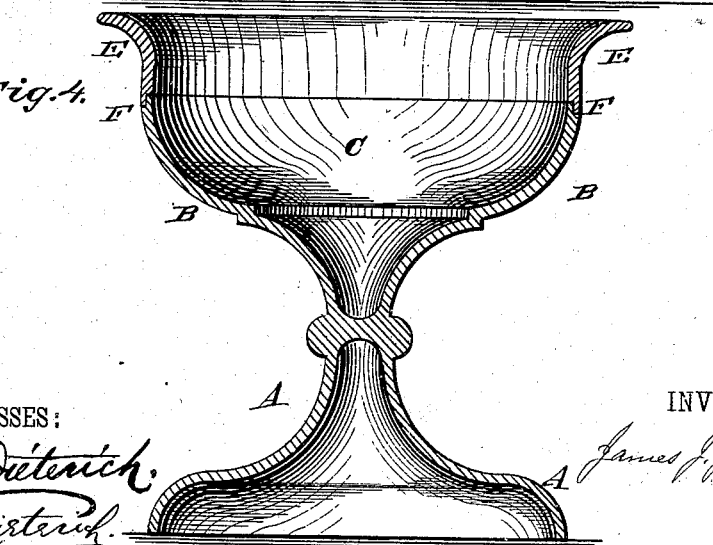

In the accompanying drawings, which form part of this specification, Figures 1 and 2 are side elevations of my improvement in flower-vases, and representing them having different heights or depths of earth-chambers. Figs. 3 and 4 are vertical sections of the same.

Reference being had to the accompanying drawings, A represents the pedestal, the upper portion, B, of which forms the lower part of the earth-chamber C, upon which are placed detachable sections D, D, D, and E of the earth-chamber, which sections are rabbeted at F, so as to fit the one upon the other and be interchangeable, so that any one or more of said sections D may be removed and the top section, E, placed upon the remaining section D, or on the part B, as shown in Figs. 2 and 4.

It will be readily seen that the earth-chamber C may be increased or diminished in depth or height at the pleasure of the user. The advantage of constructing the vase so that its earth-chamber can be increased or diminished in depth adapts the vase to the planting of the various kinds of plants and flowers, some plants and flowers requiring greater depth of earth than others. Another advantage consists in protecting the young plant by placing said sections around it above the surface of the earth in the vase, as shown in Fig. 3 and when necessary or desirable a plate of glass may be placed over the plant, as indicated by dotted lines in Fig. 3. When the plant becomes sufficiently strong, and it is desirable to expose it to atmospheric currents of air, the sections above the surface of the earth in the chamber can be readily removed, and in case a greater depth of earth is desirable for the plant it may be had by adding an additional section D.

The vase hereinbefore described may be constructed of cast-iron, terra-cotta, or other suitable material, but preference is given to cast-iron on account of strength and durability and the influence of the iron upon the earth and plant, there being sufficient oxidation of the inner surface of the earth-chamber of the vase to produce a beneficial effect upon the plant by the chemical action of the oxide of iron upon the earth in the vase, which chemical action is transmitted to the plant.

Having thus described my invention, what I claim as new, and desire to secure by Letters Patent, is—

A flower-vase consisting of pedestal A, having earth-chamber C, and detachable sections D, D, D, and E, rabbeted at F, so as to be interchangeable, and for increasing or diminishing the depth of the earth-chamber, substantially as described, and for the purpose set forth.

JAMES J. JOHNSTON.

Witnesses:
T. D. D. OURAND,
FRED. G. DIETERICH.